May 19, 1931.  C. HIRE  1,806,350

FORCE TABLE

Filed Aug. 28, 1928

WITNESS
C. B. Shilling

INVENTOR
Charles Hire
BY
ATTORNEY

Patented May 19, 1931

1,806,350

UNITED STATES PATENT OFFICE

CHARLES HIRE, OF MURRAY, KENTUCKY

FORCE TABLE

Application filed August 28, 1928. Serial No. 302,586.

This invention appertains to improvements in force tables, and has for an object to provide a type of the same for use in giving instructions in the laws of the composition and resolution of forces by a practical demonstration.

Another object of the invention is to provide a device of the class set forth, which is of a comparatively simple and economical but durable and efficient construction and arrangement of parts, and which has the advantages of ease of operation and clearness of the principle taught in its use.

With the foregoing and other equally important objects and advantages in view, the invention resides in the certain new and useful combination, construction and arrangement of parts as will be hereinafter more fully described, set forth in the appended claims, and illustrated in the accompanying drawings, in which:—

Figures 1, 2:
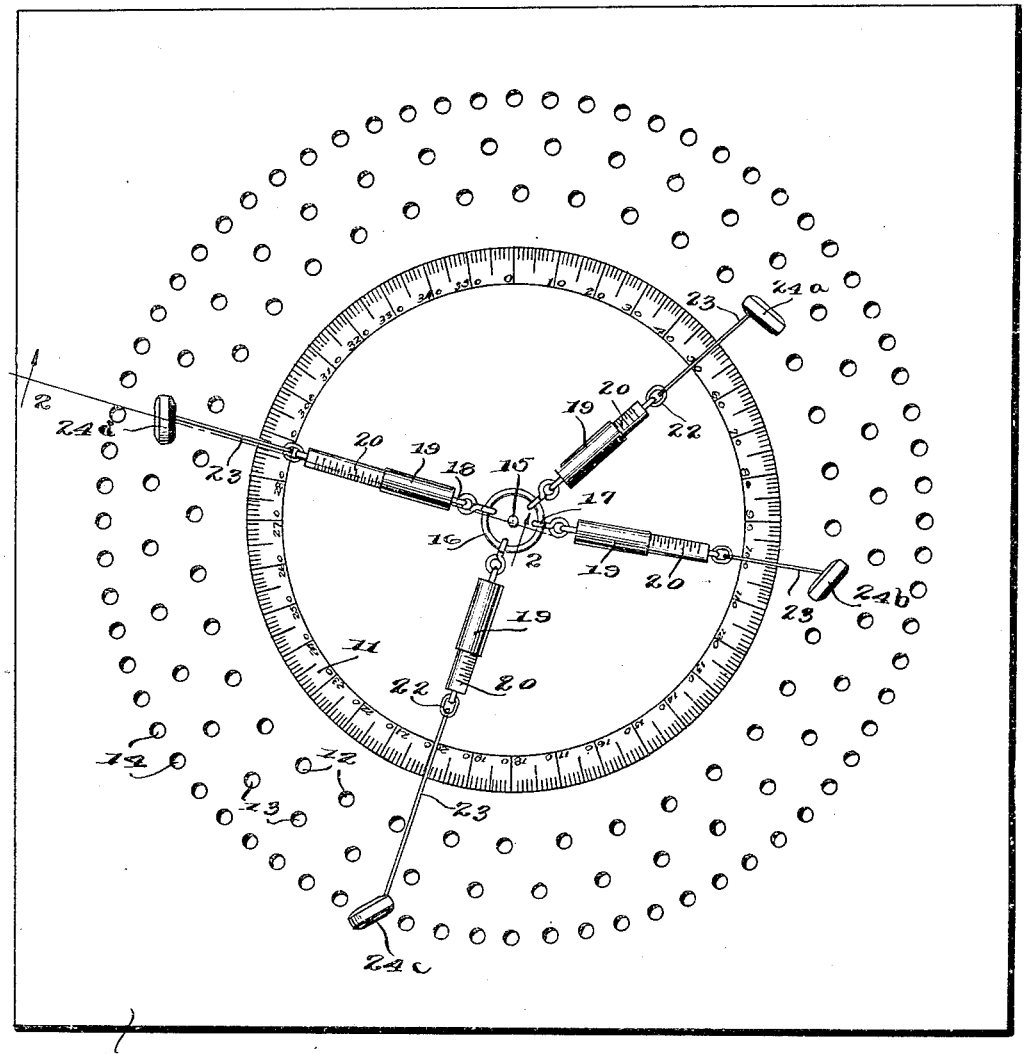
Figure 1 is a top plan view of a practical embodiment of the invention.
Figure 2 is an enlarged fragmentary section taken on the line 2—2 of Fig. 1.

Referring to the drawings, wherein like characters of references designate corresponding parts in the two views thereof, the embodiment of the invention as shown therein by way of example, is constituted in a base member or table 10, preferably of rectangular form in plan, having a circular scale 11 graduated in units of circular measure formed in or otherwise mounted on its upper surface and at the center thereof, and a plurality of circular groups of apertures disposed in concentrically spaced relation with respect to the scale 11 and to each other, the individual apertures of each group being preferably spaced equi-distantly apart, one from the other, and the spaces between apertures of one group different from that of the others. As shown in Fig. 1, three groups of the apertures are employed in the present instance of the invention, and, for the sake of clearness of description, the inner group is designated generally as at 12, the middle group as at 13, and the outer group as at 14.

Rising from the top surface of the base or table 10, at the center of the circular scale 11, is a reference post 15, which is encircled by a ring 16. The ring 16 is connected by substantially hook like members 17 to eyes 18 attached to the inner closed ends of a plurality of tubular members 19, in the outer open ends of each of which a graduated scale member 20 is slidably engaged. These scale members 20 are normally tensioned inwardly of the members 19 by means of interconnected coil springs 21, and have their outer ends provided with eyes 22 through which the inner ends of flexible members or cords 23 are attached. The outer ends of these flexible members or cords 23 are each attached to and partially wound around actuating members or keys 24 to be interchangeably engaged in the several apertures of the circular groups of such apertures 12, 13, and 14.

The use of the device, as thus constructed and arranged will be readily understood by reference to the following illustrated problem:

Find the resultant of the three forces four (4), seven (7), and five (5) units which act at angles of fifty (50) degrees, one hundred (100) degrees, and two hundred (200) degrees, respectively, from a reference direction of zero (0) degrees.

The mathematical solution of this problem shows the resultant of these forces to be eight and nine tenths (8.9) units at an angle of one hundred and eight (108) degress and forty six (46) minutes from the reference direction. Hence, these forces should be balanced by a single force of eight and nine tenths (8.9) units in the opposite direction or at an angle of two hundred and eighty eight (288) degrees and forty six (46) minutes from the reference.

To prove the solution of the problem, as hereinbefore performed mathematically, and to illustrate or otherwise demonstrate the action of the forces with the force table forming the subject matter of the present invention, the following operations will now be proceeded with:

First, set the key 24$^a$ of one of the graduated balances 19, 20, so that its connecting cord 23 pulls from the reference post 15 at an angle of fifty (50) degrees from the zero

(0) direction, Second, set a second key, as for instance the key 24<sup>b</sup>, so that its connecting cord 23 pulls at an angle of one hundred (100) degrees from the zero (0) direction, Third, set a third key, as for instance, the key 24<sup>c</sup>, at a point of two hundred (200) degrees from the zero (0) direction, and, Fourth, set the last of the keys 24 at two hundred and eighty eight (288) degrees and forty six (46) minutes from the zero (0) direction. With the several keys positioned in proper apertures in the groups 12, 13, and 14, whereby the connecting cords 23 bisect the designated points on the circular scale 11, the operator will now turn the keys so that the first three, namely 24<sup>a</sup>, 24<sup>b</sup>, and 24<sup>c</sup>, withdraw the balanced scale members 20 outwardly of the tubular housings 19 to graduations on the scale members 20 indicative of the three forces designated in the problem, and the fourth key, namely 24<sup>d</sup>, so that the balance scale 20 complemental thereto indicates the resultant of these forces, namely, eight and nine tenths (8.9) units. As soon as the keys have been properly manipulated, they are forced into the selected apertures in the groups 12, 13, and 14, sufficiently to seat them therein so that they will hold their positions of adjustment. From the fact that the central connecting ring is now symmetrically disposed with reference to the center post 15, it is obvious that the answer is correct. This arrangement of forces and connecting parts is an illustration to a student of the equilibrium of forces.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In a device of the class described, a base, a circular degree scale centered on said base, a reference member rising from said base at the center of said scale, an annular member loosely encircling said reference member, a plurality of flexible members each attached at one of its ends to said annular member and adapted to be radiated therefrom to intersect graduations on the scale indicative of the length of arc between the angles at which given forces act, graduated scale balances carried by said flexible members and keys for tensioning certain of said flexible members to adjust said balances so that they indicate the forces in the ratios corresponding to the said angles, so that the resultant value shall be zero, each force being the resultant of all others taken in opposite directions, as will be indicated when said annular member is centered relatively to said reference member, said base having a plurality of circular groups of spaced apertures formed in the same at the outer side of said circular scale whereby to be interchangeably engaged by said keys, said aperture groups being arranged concentrically of said circular scale and one with respect to the other.

2. In a device of the class described, a base, a circular degree scale centered on said base, a reference member rising from said base at the center of said scale, an annular member loosely encircling said reference member, a plurality of flexible members each attached at one of its ends to said annular member and adapted to be radiated therefrom to intersect graduations on the scale indicative of the length of arc between the angles at which given forces act, graduated scale balances carried by said flexible members and keys for tensioning certain of said flexible members to adjust the balances thereof so that they indicate the forces in the ratios corresponding to the said angles so that the resultant value shall be zero, each force being the resultant of all others taken in opposite directions, as will be indicated when said annular member is centered relatively to said reference member, said base having a plurality of circular groups of spaced apertures formed in the same at the outer side of said circular scale whereby to be interchangeably engaged by said keys, said aperture groups being arranged concentrically of said circular scale and one with respect to the other, the apertures of the several circular groups thereof being arranged in staggered relation one group with respect to the others of the same.

3. In a device of the class described, a base, a circular degree scale centered on said base, a reference member rising from said base at the center of said scale, an annular member loosely encircling said reference member, a plurality of flexible members each attached at one of its ends to said annular member and adapted to be radiated therefrom to intersect graduations on the scale indicative of the length of arc between the angles at which given forces act, graduated scale balances carried by said flexible members and keys for tensioning certain of said flexible members to adjust the balances thereof, so that they indicate the forces in the ratios corresponding to the said angles so that the resultant value shall be zero, each force being the resultant of all others taken in opposite directions, as will be indicated when said annular member is centered relatively to said reference member, said base having a plurality of circular groups of spaced apertures formed in the same at the outer side of said circular scale whereby to be interchangeably engaged by said keys, said aperture groups being arranged concentrically of said circular scale and one with respect to the other, the apertures of the several circular groups thereof being arranged in staggered relation one group with respect to the others of the same, the apertures being of a different number in each group.

CHARLES HIRE.